(12) United States Patent
Farkas et al.

(10) Patent No.: US 11,764,505 B2
(45) Date of Patent: Sep. 19, 2023

(54) ADD-IN CARD CONNECTOR CONTACT OPTIMIZATION FOR HIGH-SPEED SIGNALING

(71) Applicant: DELL PRODUCTS, LP, Round Rock, TX (US)

(72) Inventors: Sandor Farkas, Round Rock, TX (US); Bhyrav Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 47 days.

(21) Appl. No.: 17/382,243

(22) Filed: Jul. 21, 2021

(65) Prior Publication Data

US 2023/0036814 A1 Feb. 2, 2023

(51) Int. Cl.
| | | |
|---|---|---|
| H01R 12/73 | (2011.01) | |
| G06F 13/40 | (2006.01) | |
| H01R 43/16 | (2006.01) | |
| H01R 13/03 | (2006.01) | |
| H01R 12/72 | (2011.01) | |

(52) U.S. Cl.
CPC ....... H01R 12/737 (2013.01); G06F 13/4068 (2013.01); H01R 12/721 (2013.01); H01R 13/03 (2013.01); H01R 43/16 (2013.01)

(58) Field of Classification Search
CPC .... H01R 12/737; H01R 12/721; H01R 13/03; H01R 43/16; G06F 13/4068
USPC ........................................................ 439/65
See application file for complete search history.

(56) References Cited

U.S. PATENT DOCUMENTS

| | | | | |
|---|---|---|---|---|
| 6,015,775 A | * | 1/2000 | Takayama | F16C 33/1095 508/108 |
| 6,111,407 A | * | 8/2000 | Hauser | G01R 33/09 29/850 |
| 8,167,631 B2 | * | 5/2012 | Ito | H01R 24/38 439/108 |
| 8,523,583 B2 | * | 9/2013 | Ito | H01R 12/721 439/108 |
| 8,764,460 B2 | * | 7/2014 | Smink | H01R 13/6597 439/92 |
| 9,453,634 B2 | * | 9/2016 | Wegleiter | F21K 9/90 |
| 10,357,306 B2 | * | 7/2019 | Stringham | A61B 18/085 |
| 10,411,379 B2 | * | 9/2019 | Wagman | C22C 9/04 |
| 10,998,657 B2 | * | 5/2021 | Esmaeili | H01R 43/16 |
| 2005/0250373 A1 | * | 11/2005 | Nakano | H01R 4/2433 439/417 |
| 2008/0146467 A1 | * | 6/2008 | Takayama | F16C 33/121 508/105 |
| 2013/0005164 A1 | | 1/2013 | Smink et al. | |
| 2020/0067235 A1 | * | 2/2020 | Long | H01R 13/6471 |
| 2020/0354849 A1 | * | 11/2020 | Li | C25D 5/14 |

* cited by examiner

*Primary Examiner* — Peter G Leigh
(74) *Attorney, Agent, or Firm* — Larson Newman, LLP

(57) ABSTRACT

A contact for a high-speed data communication interface includes a first portion configured to be coupled to a first component associated with the high-speed data communication interface, a second portion configured to be coupled to a mating contact of a second component associated with the high-speed data communication interface, and a third portion configured to provide a sliding surface when coupled to the mating contact. The sliding surface is coated with a ferromagnetic coating.

20 Claims, 4 Drawing Sheets

ADD-IN CARD CONNECTOR CONTACT OPTIMIZATION FOR HIGH-SPEED SIGNALING

FIELD OF THE DISCLOSURE

This disclosure generally relates to information handling systems, and more particularly relates to add-in card connector contact optimization for high-speed signaling in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A contact for a high-speed data communication interface may includes a first portion configured to be coupled to a first component associated with the high-speed data communication interface, a second portion configured to be coupled to a mating contact of a second component associated with the high-speed data communication interface, and a third portion configured to provide a sliding surface when coupled to the mating contact. The sliding surface may be coated with a ferromagnetic coating.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
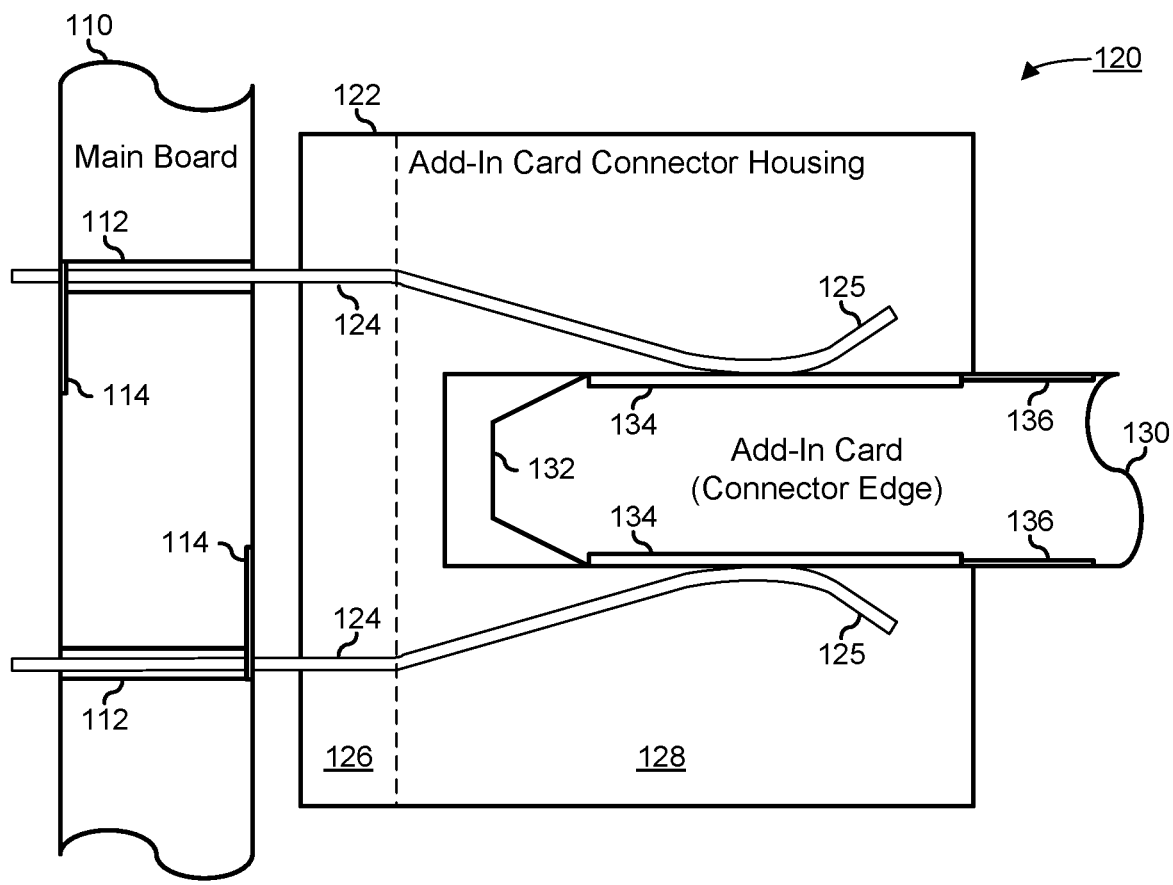
FIG. 1 illustrates an information handling system according to the prior art.

FIG. 1 illustrates an information handling system 100 according to the prior art, and includes a main circuit board 110, an add-in card connector 120, and an add-in card 130. Main board 110 includes mounting features 112 for securing and electrically connecting add-in card connector 120 to the main board. Mounting features 112 are depicted as through holes in main board 110, into which contacts 124 are inserted, and add-in card connector 120 is secured to the main board by reflowing solder that fills the through holes. In other cases mounting features 112 represent surface mount connector pads, and add-in card connector 120 is secured to main board 110 to the surface mount connector pads in a surface mount process. Main board 110 includes circuit traces 114 that connect contacts 124 to circuit features including signal circuits, control circuits, power and ground circuits.

Add-in card 130 represents an electronic device that is manufactured on a PCB to provide the desired functions and features. As such add-in card connector 120 and add-in card 130 are typically complementary, with the add-in card connector providing a female half of the connector pair, and with the add-in card providing a male half of the connector pair via an edge of the add-in card. Thus add-in card connector 120 is typically configured to mechanically retain and electrically connect add-in card 130 to main board 110. An example of an add-in card may include a PCI-Express (PCIe) add-in card such as an ×4, ×8, or ×16 PCIe add-in card, an Accelerated Graphics Port (AGP) add-in card, or a proprietary add-in card. The connector pair provided by add-in card connector 120 and add-in card 130 may include various connections for providing high-speed signal connections for a high-speed data communication interface, power and ground connections, or control connections.

Add-in card connector 120 includes a connector housing 122 and contacts 124. Connector housing 122 is manufactured to mechanically mount to main board 110 as described above, and to mechanically secure add-in card 130 into information handling system 100 and to electrically connect the add-in card to the information handling system. As such, contacts 124 each represent a discrete connection point between the circuits of main board 110 and the circuits of add-in card 130. Contacts 124 are pre-formed and rigidly affixed in a mechanical attachment region 126 to the connector housing 122 at a bottom part of the connector housing, that is at the portion of the connector housing that is situated adjacent to main board 110. As such, the rigidly affixed portion of contacts 124 in mechanical attach region 126 provide the mechanical mounting properties of add-in card connector 120. Thus, the size of contacts 124 is not necessarily shown to scale, and a longer mechanical attachment region may be needed in order to provide sufficient mechanical mounting properties for the associated add-in cards. Contacts 124 may be fabricated of copper, bronze, another alloy or material, and may be plated with gold, copper, tin, or tin-lead.

Contacts 124 are flexible in an electrical contact region 128, and are pre-formed such that they extend into the add-in card slot when no add-in card is installed. Then, when add-in card 130 is installed, sliding portions 125 of contacts 124 engage with a tapered end 132 of the add-in card to flex the contacts out of the way of the add-in card. Such flexing and movement of contacts 124 provides a contact pressure onto mated contact fingers 132 of add-in card 130 to ensure a good electrical connection between the circuit elements of main board 110 and the circuit elements of add-in card 130 that are connected to contact fingers 134 via circuit traces 136.

It has been understood by the inventors of the current disclosure that electrically, the presence of sliding portion 125 presents in the associated circuit as an open circuit stub that can contribute loss in the signal and unwanted reflections in the circuit traces that result in reduced signal integrity, and increases susceptibility to crosstalk from other circuits. In particular, as the speed of high-speed data communication interfaces increases, the resonate frequency associated with sliding portions 125 may encroach on the operating frequency of the associated high-speed data communication interface. However the length of sliding portions 125 is highly dictated by the mechanical needs of inserting add-in card 130 into add-in card connector 120, and is typically not amenable to significant decreases in the length of the sliding portion. As such, particularly as the operating frequencies of high-speed data communication interfaces increases, the signal integrity associated with add-in cards and their associated add-in card connectors is increasingly concerning.

Figure 2:
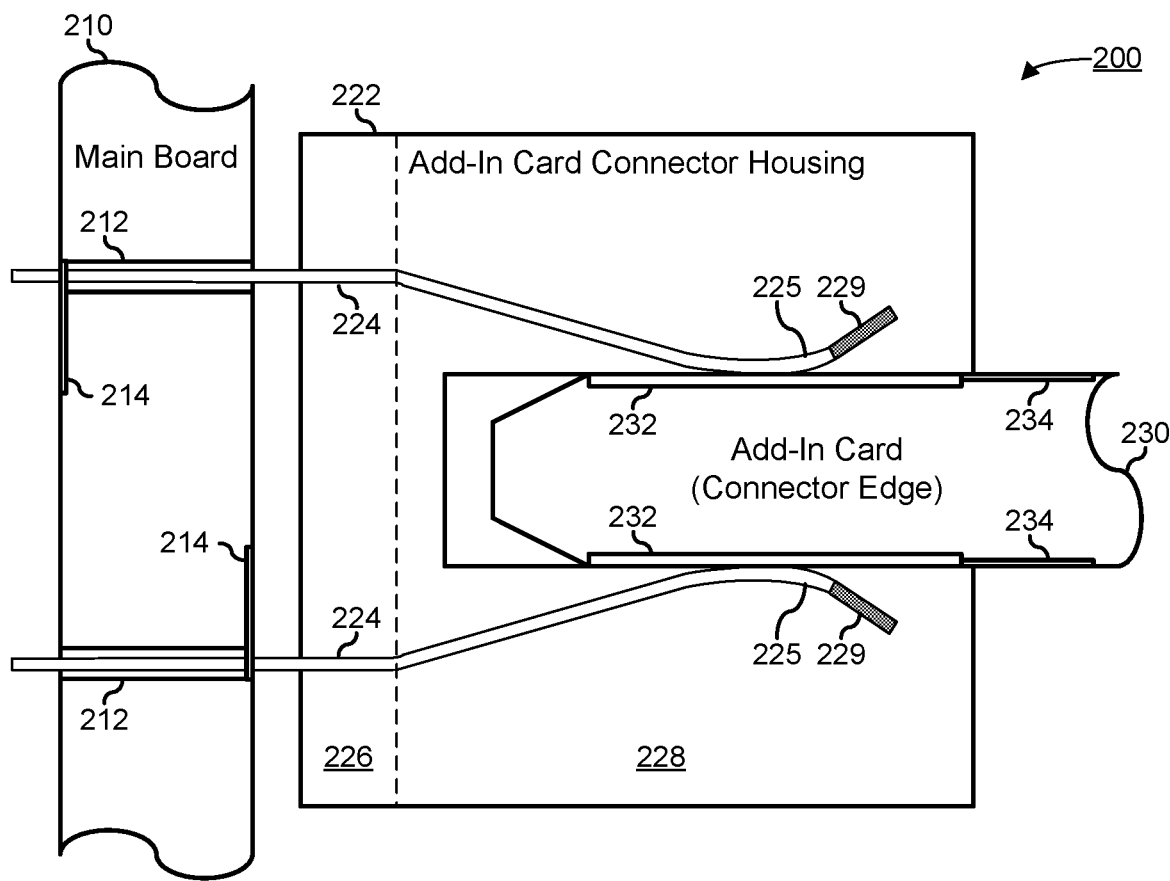
FIG. 2 illustrates an information handling system according to an embodiment of the current disclosure.
Figure 2:
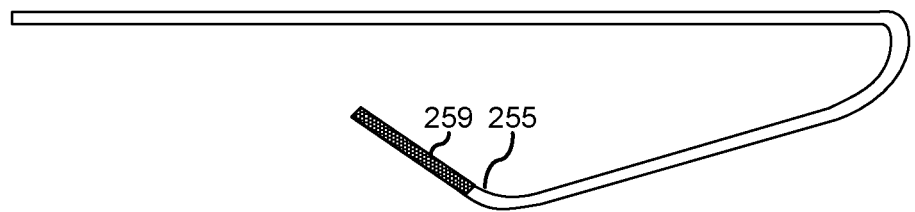

FIG. 2 illustrates an information handling system 200 according to an embodiment of the current disclosure. System 200 includes a main circuit board 210, an add-in card connector 220, and an add-in card 230. Information handling system 200 is similar to information handling system 100, where main board 210 represents a printed circuit board (PCB) that includes the components and circuitry that provides the core functions and features of the information handling system. As such, in an assembly process of information handling system 200, add-in card connector 220 is permanently attached to main board 210, thereby giving the information handling system the ability to install add-in card 230 into the add-in card connector to provide the enhanced functions and features of the information handling system.

Main board 210 is similar to main board 110 and includes mounting features 212 for securing and electrically connecting add-in card connector 220 to the main board. Mounting features 212 are depicted as through holes in main board 210, into which contacts 224 are inserted, and add-in card connector 220 is secured to the main board by reflowing solder that fills the through holes. In other cases, mounting features 212 represent surface mount connector pads and add-in card connector 220 is secured to main board 210 to the surface mount connector pads in a surface mount process. Main board 210 includes circuit traces 214 that connect contacts 224 to circuit features, including signal circuits, control circuits, power and ground circuits, and the like, as needed or desired. Add-in card 230 is similar to add-in card 130 and represents an electronic device that is manufactured on a PCB to provide the desired functions and features of the add-in card. As such, add-in card connector 220 and add-in card 230 are typically complimentary, with the add-in card connector providing a female half of the connector pair, and with the add-in card providing a male half of the connector pair via an edge of the add-in card. Thus add-in card connector 220 is typically configured to mechanically retain and electrically connect add-in card 230 to main board 210.

Add-in card connector 220 is similar to add-in card connector 120 and includes a connector housing 222, and contacts 224. Connector housing 222 is manufactured to mechanically mount to main board 210 as described above, and to mechanically secure add-in card 230 into information handling system 200 and to electrically connect the add-in card to the information handling system. As such, contacts 224 each represent a discrete connection point between the circuits of main board 210 and the circuits of add-in card 230. Contacts 224 will be understood to be pre-formed and to be rigidly affixed in a mechanical attachment region 226 to the connector housing 222 at a bottom part of the connector housing, that is, at the portion of the connector housing that is situated adjacent to main board 210. As such, the rigidly affixed portion of contacts 224 in mechanical attach region 226 provide the mechanical mounting properties of add-in card connector 220. Thus, the scale of contacts 224 are not necessarily shown to scale, and a longer mechanical attachment region may be needed in order to provide sufficient mechanical mounting properties for the associated add-in cards.

Contacts 224 are flexible in an electrical contact region 228, and are pre-formed such that they extend into the add-in card slot when no add-in card is installed. Then, when add-in card 230 is installed, sliding portions 225 of contacts 224 engage with a tapered end 232 of the add-in card to flex the contacts out of the way of the add-in card. Such flexing and movement of contacts 224 provides a contact pressure onto mated contact fingers 232 of add-in card 230 to ensure a good electrical connection between the circuit elements of main board 210 and the circuit elements of add-in card 230 that are connected to contact fingers 234 via circuit traces 236.

In a particular embodiment, sliding portions 225 are coated with a ferromagnetic coating 229 to improve the impedance characteristics of contacts 224, particularly in the operating frequency of the high-speed data communication interface signals. Ferromagnetic coating 229 is an adhesive coating applied to sliding portions 225 and includes ferromagnetic particles within the coating. Examples of ferromagnetic coating 229 include a paint, an epoxy, a powder coating, a sealant, or the like. Examples of a ferromagnetic particle may include iron, nickel, cobalt, neodymium magnet particles, rare earth magnetic particles, or other suitable magnetic particles, as needed or desired. The processing of contacts 224 may include applying ferromagnetic coating 229 in any suitable process step of the manufacture of the contacts.

For example ferromagnetic coating 229 may be applied after stamping or forming of the base contact profile, but before any bending process to form the final profile of the contact, or may be applied after the bending process, as needed or desired. In the case of contacts 224, it may be more desirable to form the final profile prior to any coating step to apply ferromagnetic coating 229. However the profile of contacts 224 as illustrated is exemplary, and other contact profiles may be utilized as needed or desired. For example, an alternative contact 250 is illustrated, having a sliding portion 255, and a ferromagnetic coating 259 coated onto the sliding portion. It may be desirable to apply ferromagnetic coating 259 prior to forming the final profile of contact 250. The coating process may include any pre-treatment of contacts 224 or 250, prior to the application of respective ferromagnetic coatings 229 and 259 as needed or desired.

For example, a pre-cleaning of contacts 224 or 250 may be provided by bathing the contacts in a cleaning solution or mineral spirits to remove oils or debris from the contacts prior to the application of respective ferromagnetic coatings 229 and 259. Ferromagnetic coatings 229 and 259 may be applied to respective contacts 224 and 250 utilizing any suitable coating process. For example, ferromagnetic coatings 229 and 259 may be applied in a dipping process, a spraying process, a powder coating process, or any other suitable process, as needed or desired. The coating process may include any post-treatment of contacts 224 and 250 as needed or desired. For example, contacts 224 and 250 may be subjected to a drying process, a heat treating process, or the like.

The impedance of sliding portion 225 is a complex function with the frequency of the signal carried on contacts 224. In particular:

$$Z = j\omega L \qquad \text{Equation 1;}$$

where:

$$L = L_{Real} + j L_{Imag} \qquad \text{Equation 2;}$$

where Z is the impedance in ohms, j is the complex variable, $\omega$ is the frequency in Hertz, L is the inductance in Henries, $L_{Real}$ is the real portion of the inductance, and $L_{Imag}$ is the imaginary portion of the inductance. Thus:

$$Z = j\omega(L_{Real} - L_{Imag}) \qquad \text{Equation 3;}$$

expresses the complex impedance of sliding portion 225. Table 1 below illustrates the impedance of a bare sliding portion with versus the impedance of a coated sliding portion. It can thus be seen that, as the frequency of the high-speed data communication signal increases, the imaginary portion ($L_{Imag}$) increases. This is because the presence of the ferromagnetic coating induces eddy current and hysteresis losses in the skin effect at higher frequencies, resulting in reduced reflections and increased impedance.

Figure 3:
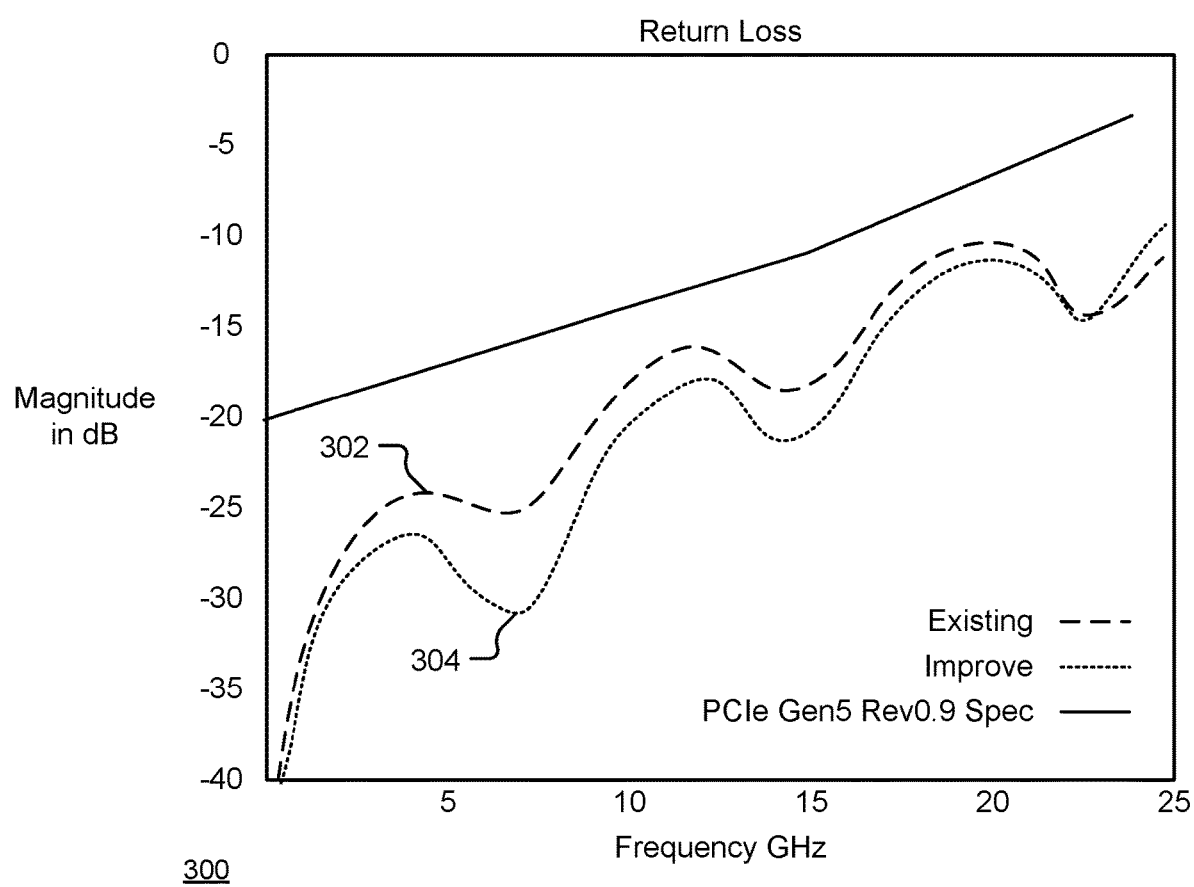
FIG. 3 illustrates an example of circuit performance with an information handling system in accordance with FIG. 1, as compared with the circuit performance with an information handling system in accordance with FIG. 2.

FIG. 3 illustrates experimental result for circuit traces as measured by the return loss 300. A connector with uncoated contacts is shown in trace 302, and a connector with coated contacts is shown in trace 304. In the particular case of PCIe connections, where the operating frequency is around 8 GHz, it can readily be seen that the case with coated contacts, as shown in trace 304, provides better return loss performance.

TABLE 1

Contact Inductance

| Frequency | Uncoated | Coated |
|---|---|---|
| 10k Hz | $3.0 \times 10^{-9} - j3.0 \times 10^{-12}$ Henries | $5.4 \times 10^{-9} - j5.9 \times 10^{-12}$ Henries |
| 100k Hz | $3.0 \times 10^{-9} - j1.1 \times 10^{-12}$ Henries | $5.4 \times 10^{-9} - j5.9 \times 10^{-11}$ Henries |
| 1M Hz | $3.0 \times 10^{-9} - j9.8 \times 10^{-12}$ Henries | $5.3 \times 10^{-9} - j5.9 \times 10^{-10}$ Henries |
| 10M HZ | $2.8 \times 10^{-9} - j2.9 \times 10^{-11}$ Henries | $2.3 \times 10^{-9} - j2.3 \times 10^{-9}$ Henries |

Coating of sliding portions of other types of connectors may benefit from the application of ferromagnetic coatings to improve high-frequency performance in high-speed data communication interfaces, not only in the case of card edge connectors. For example in pin and socket type connections, a portion of the pin may extend beyond the socket and form an open circuit stub. Here, the application of a ferromagnetic coating on the tip of the pin may improve the performance of the pin and socket connection. It will be further understood that, where a connector includes contacts for multiple types of signals, such as for high-speed data communication interface signals, power and ground contacts, control signals, and the like, that not all contacts may need to be coated with the ferromagnetic coating as described above, but that, in a particular embodiment, only the contacts associated with a high-speed data communication interface are coated with a ferromagnetic coating.

The details of PCB manufacture, through-hole connector mounting, surface mount connector mounting, reflow solder assembly, surface mount assembly, and the like, are known in the art, and will not be further described herein, except as needed to illustrate the current embodiments.

Figure 4:
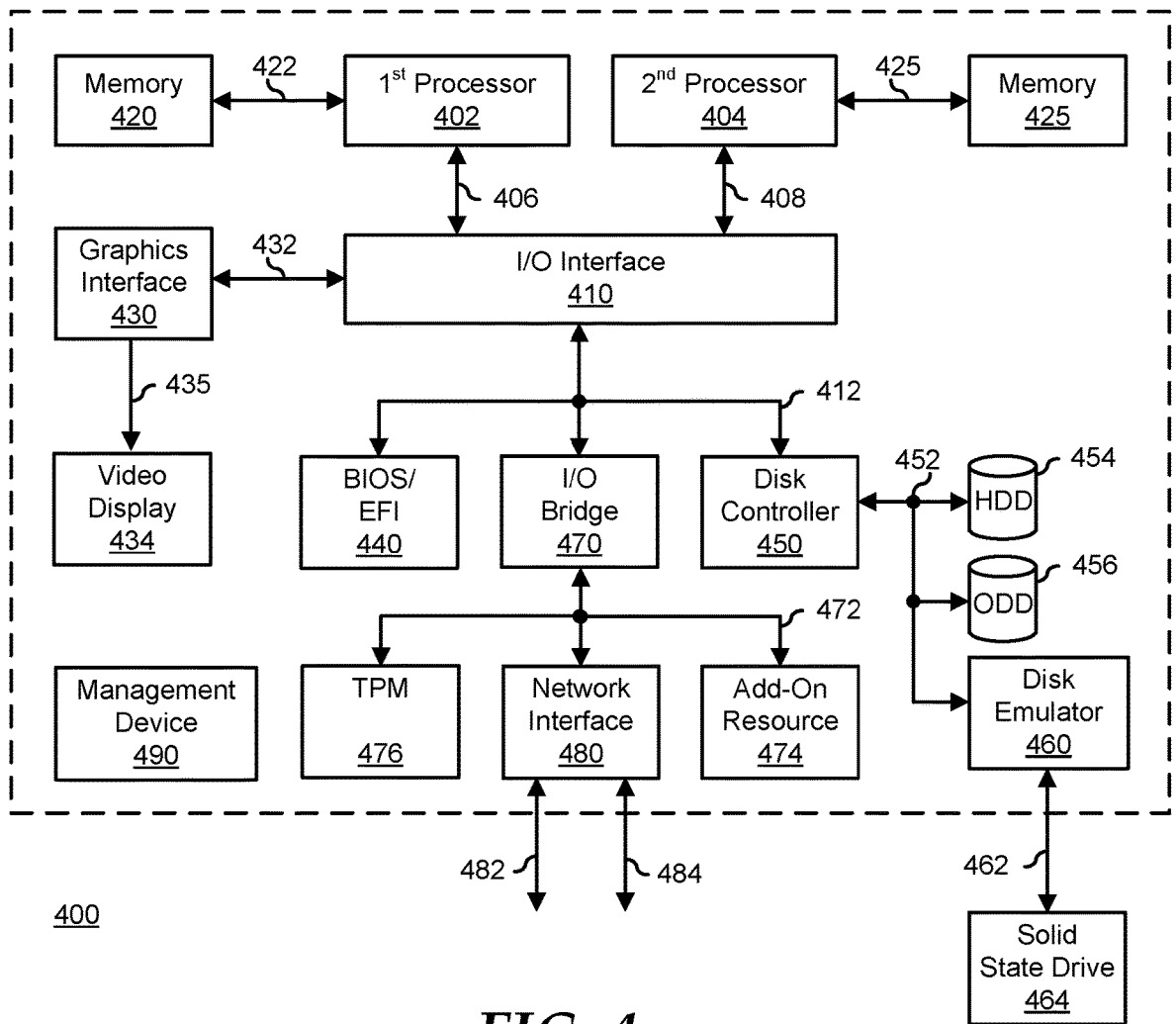
FIG. 4 is a block diagram illustrating a generalized information handling system according to another embodiment of the present disclosure.

FIG. 4 illustrates a generalized embodiment of an information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A contact for a high-speed data communication interface, the contact comprising:
   a first portion configured to be coupled to a first component associated with the high-speed data communication interface;
   a second portion configured to be coupled to a mating contact of a second component associated with the high-speed data communication interface; and
   a third portion configured to provide a sliding surface when coupled to the mating contact, wherein the sliding surface is coated with a ferromagnetic coating.

2. The contact of claim 1, wherein the sliding surface presents an open-circuit stub when a signal of the high-speed data communication interface is transmitted through the contact.

3. The contact of claim 2, wherein the ferromagnetic coating operates to reduce a resonance of the open-circuit stub.

4. The contact of claim 2, wherein the ferromagnetic coating operates to reduce an insertion loss through the contact.

5. The contact of claim 1, wherein the ferromagnetic coating comprises a bonding material infused with a ferromagnetic material.

6. The contact of claim 5, wherein the coating material comprises one of a paint, an epoxy, a powder coating, and a sealant.

7. The contact of claim 5, wherein the ferromagnetic material comprises one of iron particles, nickel particles, cobalt particles, neodymium magnet particles, and rare earth magnetic particles.

8. The contact of claim 1, wherein the contact is fabricated of one of copper, and bronze.

9. The contact of claim 8, wherein the contact is plated with one of gold, copper, tin, and tin-lead.

10. A method for forming a contact for a high-speed data communication interface, the method comprising:
    forming, on the contact, a first portion configured to be coupled to a first component associated with the high-speed data communication interface;
    forming a second portion configured to be coupled to a mating contact of a second component associated with the high-speed data communication interface;
    forming a third portion configured to provide a sliding surface when coupled to the mating contact; and
    coating the sliding surface with a ferromagnetic coating.

11. The method of claim 10, wherein the sliding surface presents an open-circuit stub when a signal of the high-speed data communication interface is transmitted through the contact.

12. The method of claim 11, wherein the ferromagnetic coating operates to reduce a resonance of the open-circuit stub.

13. The method of claim 11, wherein the ferromagnetic coating operates to reduce an insertion loss through the contact.

14. The method of claim 10, wherein the ferromagnetic coating comprises a bonding material infused with a ferromagnetic material.

15. The method of claim 14, wherein the coating material comprises one of a paint, an epoxy, a powder coating, and a sealant.

16. The method of claim 14, wherein the ferromagnetic material comprises one of iron particles, nickel particles, cobalt particles, neodymium magnet particles, and rare earth magnetic particles.

17. The method of claim 10, wherein the contact is fabricated of one of copper, and bronze.

18. The method of claim 17, wherein the contact is plated with one of gold, copper, tin, and tin-lead.

19. A connector for coupling an add-in card to a printed circuit board, the connector comprising:
    a housing configured to be affixed to the printed circuit board and including a slot for retaining the add-in card; and
    a contact for a high-speed data communication interface between the printed circuit board and the add-in card, the contact including:
       a first portion configured to be coupled to a first component associated with the high-speed data communication interface;
       a second portion configured to be coupled to a mating contact of a second component associated with the high-speed data communication interface; and
       a third portion configured to provide a sliding surface when coupled to the mating contact, wherein the sliding surface is coated with a ferromagnetic coating.

20. The contact of claim 19, wherein the sliding surface presents an open-circuit stub when a signal of the high-speed data communication interface is transmitted through the contact.

* * * * *